Figure 1:
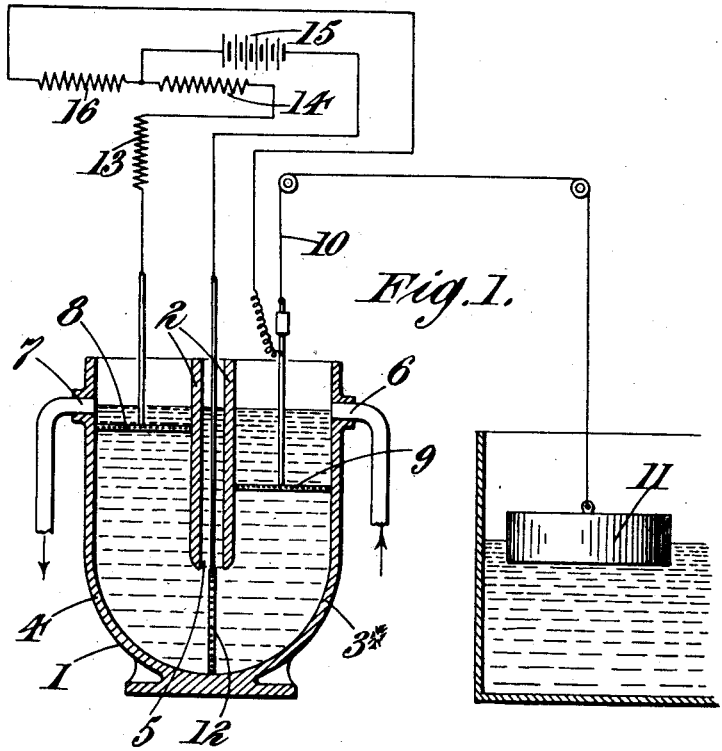

Sept. 3, 1929.  G. F. SHOTTER  1,727,254
APPARATUS FOR MEASUREMENT OF THE LEVEL AND FLOW OF LIQUIDS
AND THE HEIGHT OR MOVEMENT OF A BODY
Filed July 22, 1925    4 Sheets-Sheet 1

Inventor
George Frederick Shotter
per
William L. Symons
his Atty.

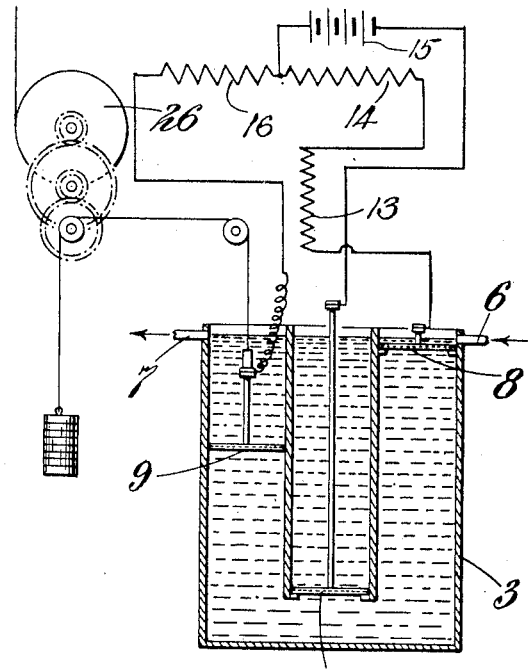
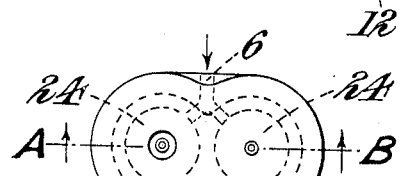
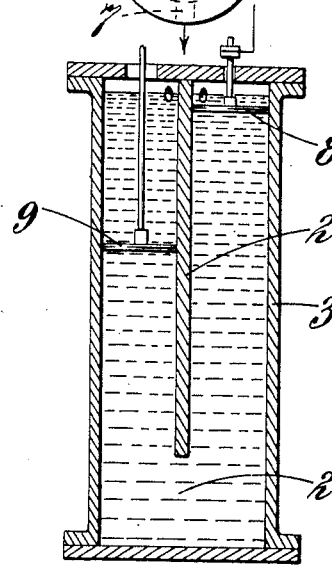

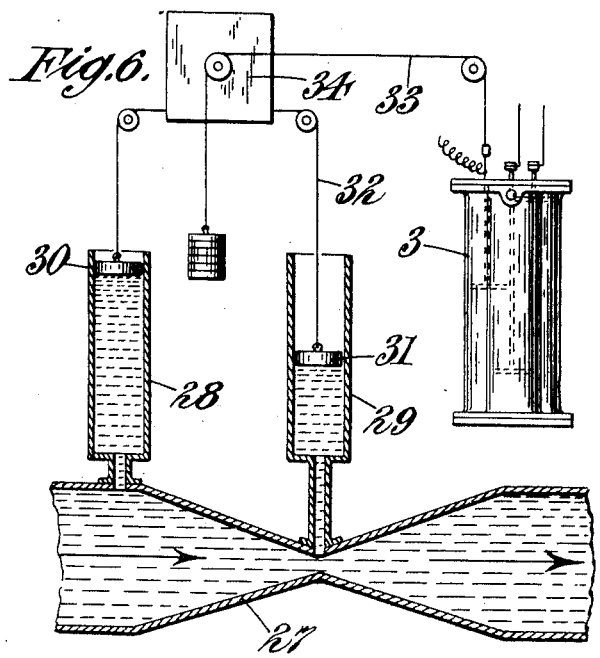
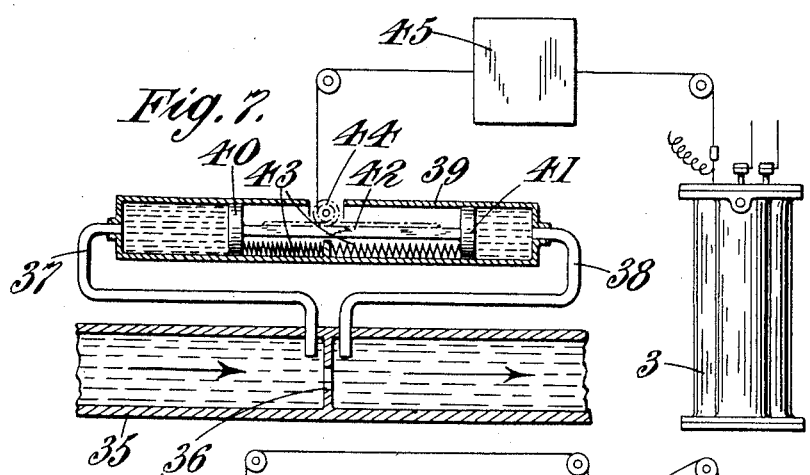
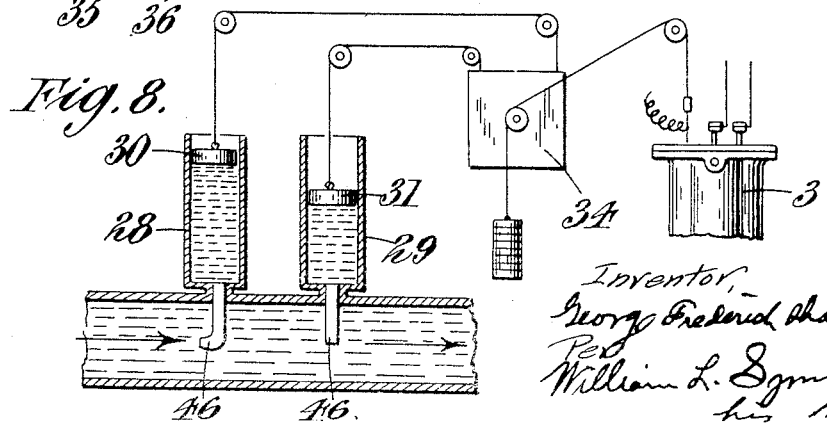

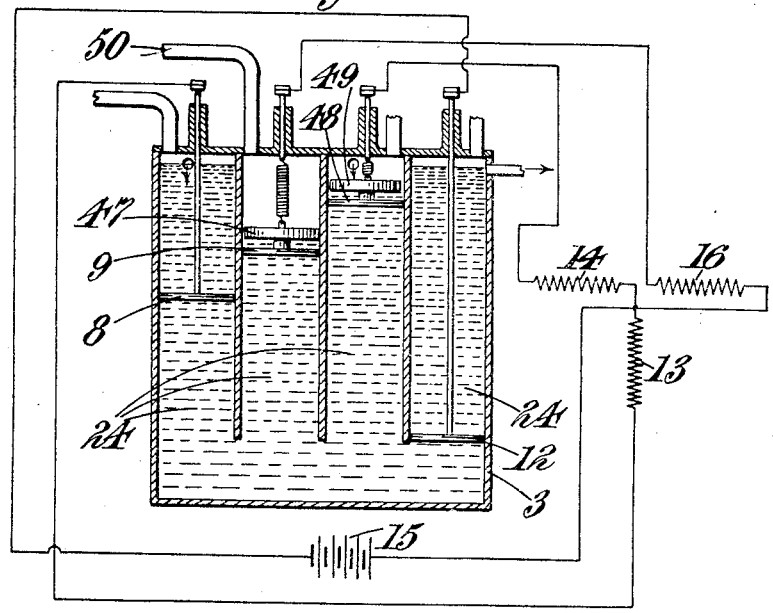
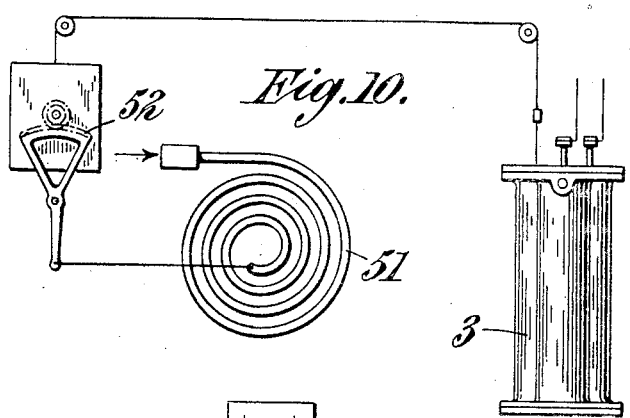
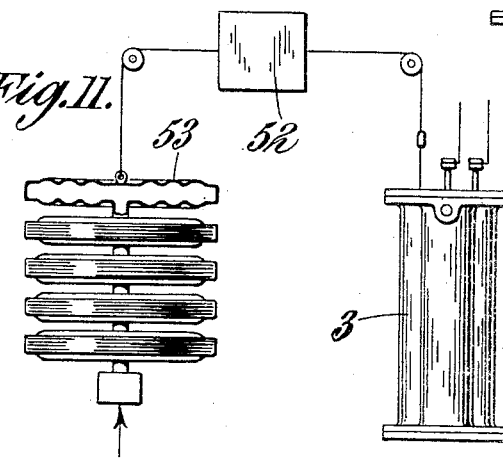

Patented Sept. 3, 1929.

1,727,254

UNITED STATES PATENT OFFICE.

GEORGE FREDERICK SHOTTER, OF NEW SOUTHGATE, ENGLAND.

APPARATUS FOR MEASUREMENT OF THE LEVEL AND FLOW OF LIQUIDS AND THE HEIGHT OR MOVEMENT OF A BODY.

Application filed July 22, 1925, Serial No. 45,347, and in Great Britain September 23, 1924.

This invention relates to apparatus for the measurement of the level and flow of liquids and the height of movement of a body and it has for its object improvements by which certain advantages shall be obtained.

In the specification of prior British Letters Patent No. 17,044 of 1911, granted to the applicant herein, apparatus is described for the electrical measurement of the level or flow of a liquid comprising a main or level-measuring pair of electrodes at a fixed distance apart so immersed in the liquid that the resistance between them changes when the level changes within the limits to be observed, in combination with a compensating pair of electrodes immersed to a constant degree in the liquid or in liquid of similar polarizing properties, an electrical generator and a resistance indicator which has a control-producing circuit and a circuit to provide a deflecting force, the parts being so connected that the generator, the control-producing circuit and the compensating electrodes are in one closed circuit and the generator, the circuit to provide deflecting force and the main electrodes are in a second closed circuit.

The present invention comprises apparatus for the electrical measurement of position, e. g. the height or the movement of a body, such as a gasometer, and is of the kind including a main pair of electrodes immersed in liquid, a compensating pair of electrodes immersed therein to a constant degree, or in liquid of similar polarizing properties, an electrical generator and a resistance indicator which has a control-producing circuit and a circuit to provide a deflecting force, the generator, control producing circuit and the compensating electrodes forming one closed circuit, and the generator, the circuit to provide the deflecting force and the main electrodes forming another closed circuit. The distance between the main electrodes is varied in accordance with the position to be measured.

Thus, one of the main electrodes may be fixed and the other connected to a float in the liquid whose level or flow is to be measured or be connected to the body whose height or movement is to be measured through, if desired, a reduction or multiplying gear.

The main electrodes and the compensating electrodes may be disposed in the separate legs of a U-tube. The electrodes may have either a common cathode or a common anode.

Preferably, provision is made for a constant stream of liquid through the vessel containing the electrodes for the purpose of preventing polarization or variation of the liquid.

Forms of the present invention will now be described with reference to the accompanying drawings wherein:—

Figure 2:
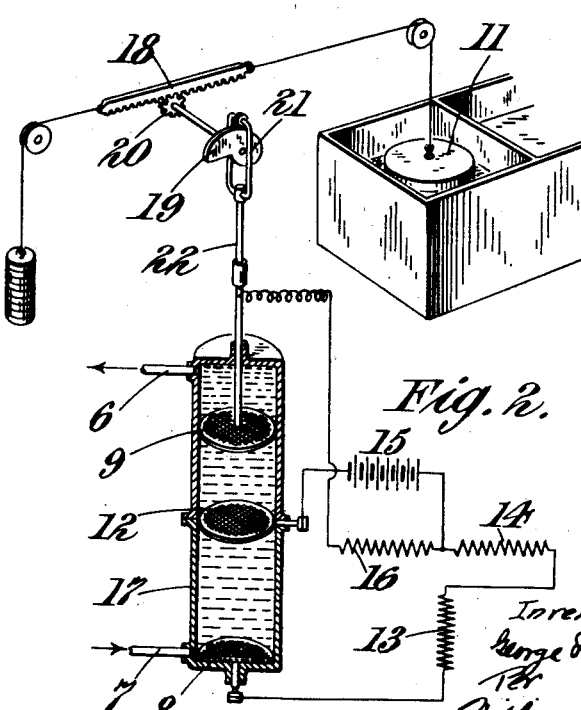

Fig. 1 shows one form; and
Fig. 2 a modified form.
Fig. 3 shows a plan; and
Fig. 4 a section of the line A—B of Fig. 3 of a convenient form of vessel to receive the electrodes:
Fig. 5 indicates diagrammatically a form of the invention for measuring large variations in height:
Fig. 6 shows the application of the invention to a Venturi meter:
Fig. 7 shows the application of the invention to the measurement of large heads:
Fig. 8 shows the application of the invention to the measurement of the flow of liquid in tubes, by means of Pitot tubes: and
Figs. 9, 10, and 11 shows the application of the invention to the measurement of gas pressure.

Referring to Fig. 1, a vessel of glazed earthenware or porcelain 1 is divided by a pair of partitions, 2, 2 which are spaced apart and which do not extend to the bottom. The partitions divide the vessel to form it into a U-tube, having two legs 3, 4 and a third leg 5 between them. An inlet 6 towards the top of the leg 3, and outlet 7 towards the top of the leg 4 are provided for liquid, whereby a continuous flow can be maintained through the tube. In the leg 4 is suspended the anode 8 of the compensating pair of electrodes, and in the leg 3 is suspended the anode 9 of the main pair of electrodes. The latter is attached by a flexible connector, such as the cord 10, to a float 11 in the liquid, whose height or flow is to be measured, so that its position in the tube is varied in accordance with the movement of the float 11. A cathode 12, common to the two anodes is arranged at the bottom of the U-tube.

The electrodes are constructed of wire or gauze, for example platinum, nickel or ferronickel, mounted on suitable supports or frames which are preferably of the shape of the interior of the U-tube.

The electrodes are connected to a resistance indicator and a battery. The resistance indicator has a control-producing circuit, and a circuit to provide a deflecting force. The anode 8 is connected through two coils 13, 14 of the resistance indicator, arranged in series and the battery 15 to the cathode 12. The main anode 9 is connected through a third coil 16 of the indicator, and the battery 15 to the cathode 12. There are thus two paths for the current, one being through the compensating electrodes 8 and 12 and the coils 13 and 14. These coils are arranged to produce magnetic fluxes at right angles to one another, which combine to give controlling force in the instrument; the second path between the main electrodes 9 and 12, and through the coil 16 provides the deflecting force in the form of a magnetic flux opposing that produced by the coil 14. The controlling and deflecting force operate conjointly upon a piece of moving iron in a manner that is well known in electrical instruments: or the coils may be suspended to move in a magnetic field. It will be observed that the arrangement of the coils 13, 14, 16 embodies the principle commonly employed in an ohmmeter, and the indications of the instrument are, therefore, such as, with suitable graduation of the scale, will indicate the distance between the electrodes 9 and 12 independently of the voltage applied by the battery 15, and also independently of the E. M. F. of polarization, since this latter E. M. F. operates in, and in the same direction in, both the circuit containing the coil 16, and that containing the coils 13, 14.

It will be seen that the electrical connections of the apparatus are those shown in Fig. 4 of the drawings appended to the complete specification of British Letters Patent No. 17,044 of 1911, and they need not be further discussed.

In operation the compensating electrodes, 8, 12 are maintained at a fixed distance apart, and the position of the anode of the main pair of electrodes is varied in accordance with the level of the liquid in which the float is supported, whereby the current which flows through one of the circuits of the resistance indicator is varied and the resistance indicator gives a reading on its scale which varies in accordance with the movement of the anode 9: the scale of the resistance indicator may be calibrated to read height, or flow of liquid if the movement of the anode 9 is in accordance with the height of liquid over a notch. The apparatus may be employed to measure the height or movement of a body by attaching the electrode 9 to said body.

In Fig. 2 is illustrated a modification of the invention in which the container for the electrodes comprises a vertical tube 17, with the common cathode 12 mounted at a point intermediate its ends, the anode 8 of the compensating pair of electrodes arranged at the bottom, and the anode 9 of the main pair of electrodes on the upper side of the common cathode. In this arrangement of the invention the transmission of the movement of the float 11 to the anode 9 is indicated as taking place through intermediate gearing. This may be of any convenient form and in the drawing is shown as consisting of a rack 18, which drives a snail cam 19 through a pinion 20. The cam 19 bears on a stirrup 21, mounted on a rod 22 carrying the anode 9. By employing various shaped cams the scale of the resistance indicator can be obtained in any desired form, for example, if the float is employed to measure the height of water passing over a V-notch, by employing a suitable shaped cam, the relation between the flow of water and the readings of the resistance indicator may be caused to follow a straight line law.

It will be understood that any form of intermediate gearing may be employed and some forms are illustrated in other figures of the drawings.

Figs. 3 and 4 show a convenient form of vessel to contain the electrodes. It consists of a vessel 3, of glazed earthenware, porcelain or the like, having an intermediate partition 23, which divides it into three circular compartments 24, the said partition not extending to the bottom, so that a common connecting chamber 25 is formed. The vessel 3 is thus a U-tube having three legs. The anode 8 of the compensating pair of electrodes is mounted near the top of one compartment 24, the anode 9 of the main pair of electrodes moves in another compartment, and the common cathode 12 is supported towards the bottom of the third compartment. An inlet 6 and outlet 7 for liquid are provided so that a continuous flow can be maintained through the vessel.

In Fig. 5 the diagrammatic development of the vessel 3 is indicated. This figure illustrates a form of the invention suitable for measuring large variations in height, and the variation is transmitted through a reduction gear 26 to the anode 9 of the main pair of electrodes.

Fig. 6 shows the application of the invention to the measurement of the difference of levels in the two pressure tubes of a Venturi meter. 27 is the Venturi meter, and 28, 29 the two tubes connected thereto. In these tubes are arranged floats 30 and 31, connected by a cord 32. Relative variations in the height of the liquid in the tubes 28, 29 causes a movement of the cord 32. This cord drives through differential gearing or other mechanism indicated by 34, a cord 33 which is attached to the anode of the main pair of electrodes contained in the vessel 3.

It will be understood that gearing other than differential gearing may be employed, and that the invention may be applied to apparatus other than a Venturi meter.

Fig. 7 indicates the application of the invention to the measurement of the difference in pressures at two points, for example, in a tube 35, having an apertured partition 36. The two points are connected by tubes 37, 38 to opposite ends of a cylinder 39, in which move a pair of pistons, 40, 41, mounted at opposite ends of a rack 42. The difference in the pressure at the ends of the tubes 37, 38, causes the pistons 40, 41 to move one way or the other against springs 43. Their movement is transmitted through the pinion 44, and if desired, gearing 45, to the anode of the main pair of electrodes contained in the vessel 3.

Fig. 8 shows the application of the invention to the measurement of small heads, for example, in Pitot tubes 46. The arrangement is similar to that illustrated in Fig. 6.

Fig. 9 shows the application of the invention to the measurement of gas pressure. The vessel 3 to contain the electrodes is a U-tube having four compartments 24. In one of these is arranged the anode 8 of the compensating pair of electrodes, in another is arranged the common cathode 12, and in a third the anode 9 of the main pair of electrodes, the said anode being carried on a float 47. In the fourth compartment another anode 48 is carried on a float 49. The compartments containing the cathode 12 and the anode 48 are open to the atmosphere, as may also be the compartment containing the anode 8. The compartment containing the anode 9 is closed and the gas pressure to be indicated is connected to it through the conduit 50. In operation the gas pressure causes the liquid to move down the chamber and thus vary the position of the anode 9. The object of having a second anode 48 carried on a float in the second chamber is to allow for variations in the level of the liquid which are not due to variations in the pressure.

The electrical connections of this apparatus differ from those previously shown. The control coil 13 is connected to the anode 8 and the cathode 12, the deflecting coil 14 is connected to the anode 48 and the deflecting coil 16 to the anode 9. The current passed through the coils 14 and 16 thus varies in accordance with the position of the anodes 9 and 48 and the indication of the instrument is in accordance with the difference between their relative movements.

In Fig. 10 gas pressure is measured by means of a Bourdon gauge tube 51, the end of which is connected through gearing 52 to the movable anode contained in the vessel 3.

In Fig. 11 gas pressure is measured by the employment of an aneroid chamber 53, which is connected through gearing 52 to the anode of the main pair of electrodes contained in the vessel 3.

Instead of employing a common cathode, a common anode may be employed for the two pairs of electrodes and separate cathodes.

Apparatus according to the present invention may be employed for the measurement electrically of position, such as the height of liquids in tubes or the difference in height of the liquid in several tubes and by the measurement of position it may be employed for the measurement of the flow of liquids or the flow of pressure of gases or liquids, or for any movement.

The resistance indicator is not shown in Figs. 6, 7, 8, 10 and 11, but it will be understood that it is similar to that shown in Figs. 1 and 2.

It will be noted that a difference between the apparatus according to the present invention and that described in the specification of prior British Letters Patent No. 17,044 of 1911, is that, whereas at zero height or flow no current passes between the main electrodes in the said earlier apparatus, in the apparatus according to the present invention, current flows between the main electrodes at all positions thereof.

Therefore, whereas in the earlier apparatus the use of a three coil indicator was for the purpose of increasing the normal scale reading of the apparatus, in the present apparatus a three coil indicator is essential if a full scale reading is desired.

The term resistance indicator in this specification and claims is to be understood to refer to an instrument which in effect measures the ratio between the resistances between, or the currents which flow between the main pair of electrodes and the compensating pair of electrodes.

Recording apparatus and, or integrating apparatus, for example, that described in the specification of my prior British Letters Patent No. 163,739 may be employed in conjunction with the apparatus according to the present invention.

What I claim is:—

1. For use in apparatus of the kind described for the electrical measurement of position a container comprising a plurality of tubular members connected at their lower ends, an electrolyte in said container and three electrodes therein one in fixed position in one tubular member another movable electrode disposed in another tubular member, means for moving said movable electrode in accordance with the movement of the body whose position is to be measured and the third and fixed electrode disposed between the other two, the two fixed electrodes constituting the compensating pair of electrodes and the movable electrode and the third electrode constituting the main pair of electrodes.

2. For use in apparatus of the kind described for the electrical measurement of position a container comprising three tubular members connected at their lower ends and three electrodes therein each in a separate tubular member, two of which are fixed and constitute the compensating pair of electrodes and the third of which is movable, and means for moving said third electrode in accordance with the movement of the body whose position is to be measured and together with one of the fixed electrodes constitutes the main pair of electrodes.

Dated this second day of July, 1925.

GEORGE FREDERICK SHOTTER.